June 6, 1972     O. REISS     3,667,887
CORE PIN MOUNTING MEANS FOR INJECTION MOLDING APPARATUS
Filed Nov. 6, 1969     2 Sheets-Sheet 1

INVENTOR.
OSCAR REISS
BY Brumbaugh, Graves, Donohue & Raymond
his ATTORNEYS.

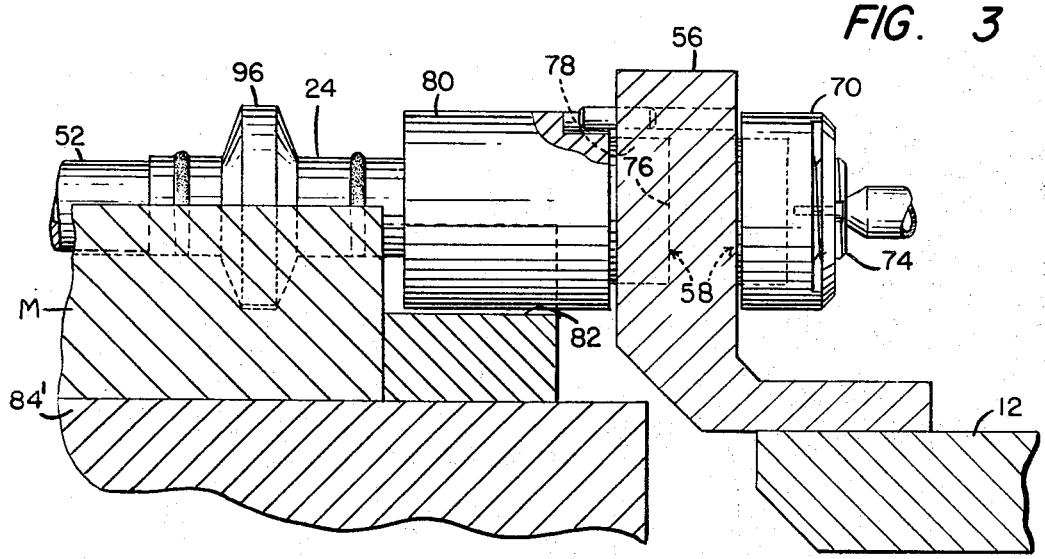
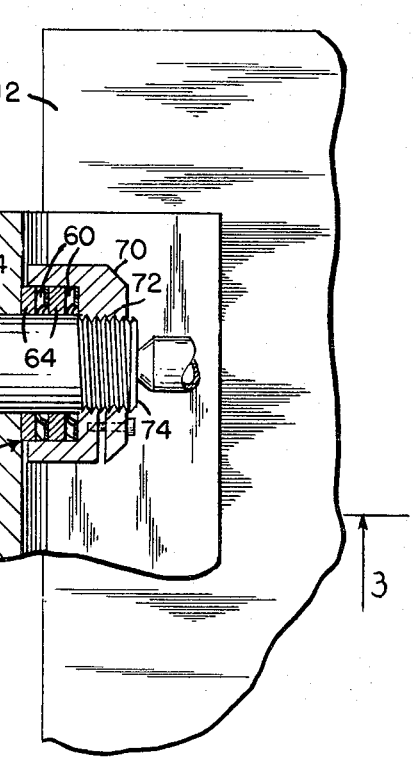

United States Patent Office 3,667,887
Patented June 6, 1972

3,667,887
CORE PIN MOUNTING MEANS FOR INJECTION MOLDING APPARATUS
Oscar Reiss, Great Neck, N.Y., assignor to APL Corporation, Brooklyn, N.Y.
Filed Nov. 6, 1969, Ser. No. 874,662
Int. Cl. B29c 17/07; B29f 1/022
U.S. Cl. 425—242                          3 Claims

ABSTRACT OF THE DISCLOSURE

Mold core pins are mounted on a turntable so that they can be indexed to four stations in sequence. Each core pin is formed with a peripheral annular flange that extends radially outwardly from the core pin and that has a radial taper. Partible injection and blow molds each having at least two sections are engageable with the core pins at selected stations. The molds cooperate with the core pins to form mold cavities. Each section of each mold is formed with a recess, and each of the recesses is tapered complementally to the core pin flanges. When the mold sections are closed about the core pins, the flanges enter the recesses. The connection between each core pin and the turntable is resilient so that the core pins when engaged are positioned by the interaction of the flanges and recesses. At all other times, the core pins are positioned by their resilient connections to the turntable.

BACKGROUND OF THE INVENTION

This invention relates to molding apparatus and, more particularly, to novel and highly effective injection-blow-molding apparatus.

In order to achieve a high rate of production of injection-blow-molded articles, it is conventional to mount mold core pins in such a manner that they can be shifted from one station to another, a separate step in the molding process being performed at each station. For example, at a first station, the core pins may cooperate with molds to define injection mold cavities. Mold substance injected into the injection mold cavities forms parisons on the core pins. The injection molds are opened, and the core pins are then indexed or shifted to a second station where they cooperate with blow mold cavities. The core pins may be provided with internal conduits whereby air or another fluid can be introduced under high pressure into the interiors of the parisons for the purpose of expanding them against the walls of the blow molds to form completed articles. The blow molds are opened, and the mold cores are indexed to a third station at which the completed articles are removed.

The preceding cycle of steps, with or without additional steps, can be repeated indefinitely, and several groups or banks of mold cores can be provided so that, while a completed set of articles is being removed at the third station, for example, another set of articles is being blown at the second station, and parisons are being formed at the first station.

As may be seen, the mold cores cooperate first with injection molds and then with blow molds. The mold cores are moreover mounted on a movable platform or base such as a rotatable turntable.

Since very high fluid pressures are used in injection-blow-molding apparatus, during both the injection stage and the blowing stage, it is necessary that the partible sections of the injection molds come together with great force to prevent leakage of plastic between them during the injection operation and that the partible sections of the blow molds likewise come together with great force to prevent extrusion of plastic between them during the blowing operation.

The great force with which the mold sections come together tends to damage the mold cores, the connections of the mold cores to the turntable or other platform on which they are mounted, or the mechanism by which the platform is moved. The primary function of the platform is to index the mold cores; it is not designed to withstand repeated application of high torque by the molds. In the event of perfect register between the partible sections of the mold on the one hand and the mold cores on the other at both the injection station and the blowing station, the apparatus would function well enough. Perfect register is not in practice obtained, however, and a residual torque or stress on the mold cores and their supporting structure is unavoidable.

Moreover, even if perfect register could initially be achieved, it would not be maintained indefinitely. Owing to normal wear and tear, the register changes slightly during successive cycles of operation. Ultimately, very great forces may be generated upon closing of the molds, sufficient to do considerable damage to the mold cores and their mounting means. This results in expensive repairs and also (and more significantly) in loss of production time.

SUMMARY OF THE INVENTION

An object of the invention is to remedy the deficiencies of conventional apparatus noted above. In particular, an object of the invention is to provide a mounting for a mold core pin so designed that no damage is done to the mold core or its mounting notwithstanding absence of perfect register between the mold core and the molds with which it cooperates.

The foregoing and other objects of the invention are attained, in a representative embodiment thereof, by the provision of a core pin formed with a peripheral annular flange, the flange extending radially outwardly from the core pin and being formed with a radial taper, and a partible mold having at least two sections engageable with the core pin. The mold cooperates with the core pin to form a mold cavity. Each section of the mold is formed with a recess, and each of the recesses is tapered complementally to the flange. Means is provided for closing the sections about the core pin so that the flange enters the recesses. The relative position of the core pin and the mold with respect to each other when the sections are closed about the core pin is determined by the interaction of the flange and recesses. The core pin is mounted by a resilient mounting that facilitates transfer or indexing of the core pin from one station to another but readily yields during the closing of the molds.

BRIEF DESCRIPTION OF THE DRAWING

An understanding of additional aspects of the invention can be gained from a consideration of the following detailed description of a representative embodiment thereof, in conjunction with the accompanying figures of the drawing, wherein:

FIG. 2 is a fragmentary plan view, partly in section and on a scale larger than FIG. 1, of a portion of the apparatus of FIG. 1; and FIG. 3 is a view taken substantially along the line 3—3 of FIG. 2 and looking in the direction of the arrows.

DESCRIPTION OF THE PREFERRED EMBODIMENT

Figure 1:
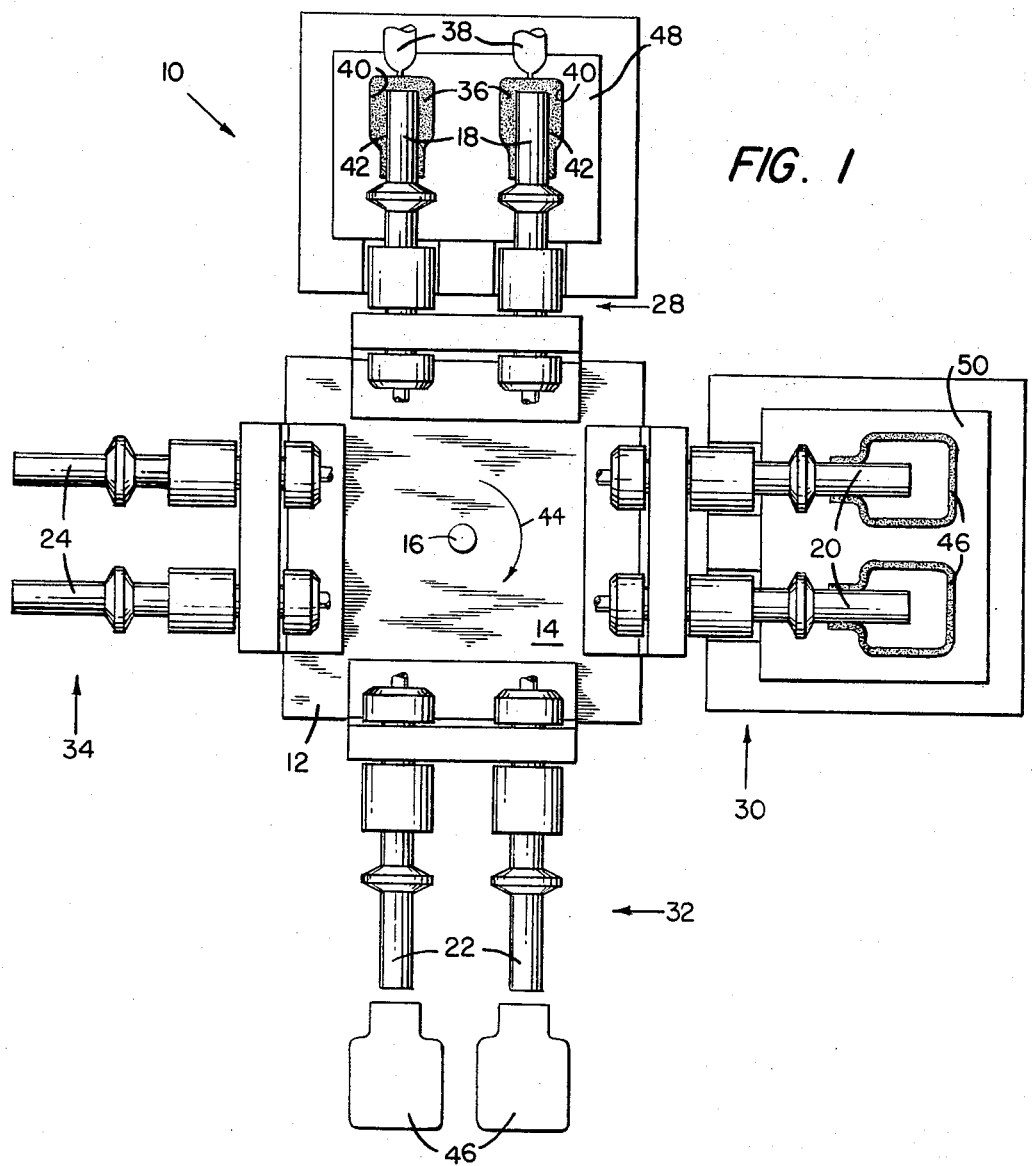
FIG. 1 is a plan view, partly in section, of a preferred embodiment of apparatus constructed in accordance with the invention.

FIG. 1 shows apparatus 10 constructed in accordance with the invention. The apparatus 10 includes a turntable 12 having a horizontal surface 14 and mounted for rotation on a vertical shaft 16.

The turntable 12 mounts a plurality of mold core pins 18, 20, 22 and 24. Any number of mold cores may be mounted on the turntable 12, eight being shown in FIG. 1. The mold cores are arranged in groups, the first group 18 being at a first station 28, the second group 20 being at a second station 30, the third group 22 being at a third station 32, and the fourth group 24 being at a fourth station 34.

The stations 28, 30, 32 and 34 are angularly spaced apart 90° from one another about the periphery of the turntable 12. Certain features of the turntable are conventional and are disclosed, for example, in a patent to De Matteo No. 3,110,913.

At the first station 28, mold substance 36 is ejected from nozzles 38 into cavities 40 defined in part by surfaces 42 of the core pins 18.

The injected mold substance 36 forms parisons on the mold cores 18, and, when the turntable 12 is rotated clockwise about the shaft 16 through an angle of 90° as shown by an arrow 44, the parisons formed at the station 28 are at the second station 30.

In FIG. 1, the mold cores 20 shown at the second station 30, having been brought to the second station 30 from the first station 28, are in position to have a fluid such as air introduced into the interiors of the parisons through channels (not shown) formed in the mold cores 20 at the second stage causes expansion of the manner expands the parisons to impart the desired shape to completed articles 46.

The outer limits of the injection mold cavities are formed by recesses in injection mold means 48 at the first station 28, and the outer limits of the expansion mold cavities are formed by recesses in an expansion mold or blow mold 50. It will be observed that the recesses in the expansion or blow mold 50 are larger than those formed in the injection mold means 48. Thus, the introduction of air or another fluid through the mold cores 20 at the second stage causes expansion of the parisons formed on the mold cores and an attenuation of the mold substance or thinning out of the walls of the article as it assumes its final shape.

Conventional means are known for facilitating disengagement of the mold cores from the mold means 48 and 50 to permit rotation of the turntable 12. For example, the mold means 48 and 50 can be made in sections which can be separated and moved to provide clearance.

The mold cores 22 are at the third station 32, which is the station at which the articles 46 completed at the second station are removed, typically by hand. The temperature of the mold cores at the third station 32 is decreasing.

The fourth station 34 is illustrated as an idle station, but various functions can be performed at this station including temperature regulation, etc., if desired.

In accordance with the present invention, the means by which the core pins are mounted is vastly improved. One of the core pins 24 (FIGS. 2 and 3) may be taken as representative. The core pin 24 shown in these figures includes a portion 52 adapted to cooperate with the mold means 48 or 50 (when at the first or second station 28 or 30, respectively) and a portion 54 that cooperates with the turntable 12 and, more particularly, with a flange 56 secured in any conventional manner to the turntable 12.

The connection between the core pin 24 and the turntable 12 includes resilient mounting means 58. The resilient mounting means 58 positions the core pin 24 during intervals when neither mold means engages the core pin 24 and includes structure such as a pair of wave spring washers 60 on one side of the flange 56 and another pair of wave spring washers 62 on the other side of the flange 56 together with annular spacers 64 cooperating with the wave spring washers 60 and annular spacers 66 cooperating with the wave spring washers 62.

The portion 54 of the core pin 24 passes through an opening 68 in the flange 56 that is of larger diameter than the portion 54 of the core pin 24 so that the core pin 24 has limited freedom of movement about a cone having its apex in the opening 68. A nut 70 is passed over threads 72 formed at the end 74 of the core pin 24 to secure the wave spring washers 60 and annular spacers 64 in position between the nut and the flange 56 and mounted circumferentially of the core pin 24.

The wave spring washers 62 and annular spacers 66 are held in a desired position along the axis of the core pin 24 by abutment against the right-hand wall 76 of an aperture 78 formed in the side of the flange 56 facing the portion 52 of the core pin 24. An enlarged cylindrical portion 80 formed on the core pin 24 limits axial movement of the wave spring washers 62 and annular spacers 66 toward the portion 52 of the core pin 24. The cylindrical portion 80 is received within an aperture 82 in a chase plate 84 bordering the mold means M (which can be considered to be the mold means 48 or 50) and supported by a base plate 84'. The cylindrical portion 80 has a diameter somewhat less than that of the aperture 82 so that the limited conical movement of the core pin 24 described above is not prevented.

In accordance with the invention, the mold core pin 24 is formed with a peripheral annular flange 86 by which the core pin 24 is accurately positioned with respect to any mold means 48 or 50 that may be closed about the core pin 24. The peripheral annular flange 86 extends radially outwardly from the core pin 24 and is formed with a radial taper: that is, the surfaces 88 and 90 are conical surfaces having the circles defining their large bases 92 and 94, respectively, at intersections of the conical surfaces 88 and 90, respectively, with a cylindrical portion 96 of the flange 86 and the circles defining their small bases 98 and 100, respectively, at intersections of the conical surfaces 88 and 90, respectively, with the cylindrical portion 52 of the core pin 24. Thus, at increasing radial distances from the portion 52 of the core pin 24, the flange 86 has a progressively smaller length measured in a direction parallel to the axis of the core pin 24.

Further in accordance with the invention, the flange 86 is adapted to be received in a milled pocket 102 formed in the mold means 48 or 50. The milled pocket 102 has radially tapered walls 104 and 106 inclined complementally to the walls 88 and 90, respectively. The walls 104 and 106 are, however, of greater length than the walls 88 and 90, so that an annular space 108 is left about the circumference of the flange 86 adjacent to the cylindrical portion 96 thereof.

The mold structure described in connection with FIGS. 2 and 3 that cooperates with the flange 86 is duplicated by upper mold structure. That is, structure that is a mirror image of the mold structure cooperating with the flange 86 illustrated in FIG. 3 fits over the top of the flange 86 so that the walls 88 and 90 of the flange 86 are engaged through 360° by complemental walls. Similarly, the annular space 108 extends a full 360° around the cylindrical surface 96 of the flange 86.

Those skilled in the art will readily understand from the preceding detailed description that, when the mold 48 or 50 is closed about the core pin 24, the resilient mounting means 58 is adapted to yield without damage, so that the cooperation between the flange 86 on the one hand and the upper and lower milled pockets on the other accurately positions the flange 86 and therefore the core pin 24, which is rigid and integral with the flange 86.

Thus, in case of misalignment between the mold means and the core pin 24, which can result from original inaccuracies in manufacture or from subsequent wear and tear, the mold means inclosing about the core pin 24 engages the flange 86 and adjusts its position slightly so that it is in a predetermined relation to the mold means. The resilient mounting means 58 permits complete freedom of movement of the core pin 24. That is, a limited adjustment of the position of the flange 86 along the axis of the core pin 24 and in a plane normal to the axis is possible, and also a limited adjustment of the orientation of the flange 86 is possible.

Adjustment along the axis of the core pin 24 is accomplished by compression of the wave spring washers 60 for movement to the left as seen in FIGS. 2 and 3 and compression of the wave spring washers 62 for movement to the right as seen in FIGS. 2 and 3. Adjustment in any direction in a plane normal to the axis of the core pin 24 is possible because the diameter of the core pin 24 is everywhere somewhat smaller than the diameters of the apertures through which it extends, the sole exception being the close engagement of the surfaces 88 and 90 with the surfaces 104 and 106, respectively. This same tolerance permits limited angular adjustment of the flange 86 so that the direction of the axis of the core pin 24 can be shifted slightly.

In accordance with the method of using the apparatus of the present invention, therefore, the mold core 24 is first brought to a first position which is approximately the desired position of the mold core for cooperation with the mold 48 or 50, while the mold 48 or 50 is in an open position. The mold 48 or 50 is then closed about the mold core 24, and the mold core 24 is brought precisely to the desired position during and in response to the closing. A molding operation is then performed, either an injection molding operation or a blow molding operation, or some other molding operation that may be desired. The mold is then opened, whereupon the resilient means 58 restores the mold core 24 to the original position thereof. This restoring of the mold core 24 to its original position occurs during and in response to the opening of the mold means.

Thus there is provided in accordance with the invention novel and highly effective molding apparatus facilitating a substantial increase in the number of cycles during which molding operations can be carried out without interruption for repairs. Many modifications of the representative embodiment disclosed herein will readily occur to those skilled in the art. For example, the slopes of the surfaces 88 and 90, which are shown as symmetrical with respect to the median plane of the flange 86, can be varied and can be symmetrical or asymmetrical, so long as they are radially tapered and engage complemental surfaces. Similarly, the amount of play afforded by the resilient mounting means 58 and the apertures traversed by the portions 52, 54 and 80 of the core pin 24 can be varied in accordance with the degree of possible misalignment between core pin and mold for which it is desired to compensate. Moreover, it goes without saying that the detailed structure described in connection with one of the core pins 24 characterizes the other core pin 24, as well as the core pins 18, 20 and 22, and any others that may be employed. Accordingly, the invention is to be construed as including all of the embodiments thereof within the scope of the appended claims.

I claim:

1. Molding apparatus comprising at least one core pin, resilient mounting means mounting said core pin, motive means effecting relative movement between said core pin and at least two stations, and mold means at at least one of said stations, said mold means effecting a rigid, intermittent connection to said core pin at said one station, and said resilient mounting means yielding while said mold means effects said rigid connection, whereby said mounting means positions said core pin during intervals when said mold means does not engage said core pin and said mold means positions said core pin during intervals when said mold means engages said core pin.

2. Molding apparatus comprising a plurality of core pins, a plurality of resilient mounting means respectively mounting said core pins, motive means moving said core pins between at least two stations, and a plurality of mold means at at least one of said stations, said mold means respectively effecting rigid, intermittent connections to said core pins at said one station, and the resilient mounting means for each core pin yielding while said core pin is engaged by one of said mold means, whereby each of said core pins is positioned by its resilient mounting means during intervals when said core pin is not engaged by one of said mold means and by one of said mold means during intervals when said core pin is engaged thereby.

3. Molding apparatus comprising at least one core pin, resilient mounting means mounting said core pin, motive means effecting relative movement between said core pin and at least two stations, injection mold means at one of said stations, and blow mold means at another of said stations, said injection mold means effecting a rigid, intermittent connection to said core pin at said one station, said blow mold means effecting a rigid, intermittent connection to said core pin at said other station, and said resilient mounting means yielding while said injection mold means and said blow mold means effect said rigid connections, whereby said mounting means positions said core pin during intervals when neither said injection mold means nor said blow means engages said core pin, said injection mold means positions said core pin during intervals when said injection mold means engages said core pin, and said blow mold means positions said core pin during intervals when said blow means engages said core pin.

References Cited

UNITED STATES PATENTS

| | | | |
|---|---|---|---|
| 3,100,913 | 8/1963 | DeMatteo | 18—5BJ X |
| 3,524,619 | 8/1970 | Natkins | 18—5BJ X |

FOREIGN PATENTS

| | | | |
|---|---|---|---|
| 889,416 | 1/1944 | France | 18—45 R |

ROBERT F. WHITE, Primary Examiner

J. H. SILBAUGH, Assistant Examiner

U.S. Cl. X.R.

425—246, 324, 387, 468; 264—97, 328

UNITED STATES PATENT OFFICE
CERTIFICATE OF CORRECTION

Patent No. 3,667,887            Dated June 6, 1972

Inventor(s) Oscar Reiss

It is certified that error appears in the above-identified patent and that said Letters Patent are hereby corrected as shown below:

Col. 1, line 63, after "base" should be a comma --,--; Col. 2, line 6, after "index" should be --or shift--; line 48, after "mounting" should be --means--; Col. 3, line 13, "3,110,913" should be --3,100,913--; line 25, "into" should be --to--; line 27, after "20" delete "at the second stage causes expansion of the" and insert -- . The introduction of the air or other fluid in this--; col. 6, line 42, after "blow" insert --mold--.

Signed and sealed this 19th day of December 1972.

(SEAL)
Attest:

EDWARD M. FLETCHER, JR.            ROBERT GOTTSCHALK
Attesting Officer            Commissioner of Patents